United States Patent [19]

Reimert

[11] Patent Number: 4,648,627
[45] Date of Patent: Mar. 10, 1987

[54] STABBING CONNECTOR

[75] Inventor: Larry E. Reimert, Houston, Tex.

[73] Assignee: Dril-Quip, Inc., Houston, Tex.

[21] Appl. No.: 571,850

[22] Filed: Jan. 18, 1984

[51] Int. Cl.$^4$ ............................................. F16L 35/00
[52] U.S. Cl. ........................................ 285/24; 285/91;
    285/92; 285/334; 285/381; 29/447
[58] Field of Search ...................... 285/334, 91, 92, 86,
    285/381, 24, 333, 27, 93; 29/447, 464; 403/273,
    343

[56] References Cited

U.S. PATENT DOCUMENTS

| | | | |
|---|---|---|---|
| 1,176,215 | 3/1916 | Griffin | 285/91 X |
| 2,636,753 | 4/1953 | Griffin | 29/447 X |
| 2,671,949 | 3/1954 | Welton | |
| 3,114,566 | 12/1963 | Coberly et al. | 285/381 X |
| 3,480,300 | 11/1964 | Jeffery et al. | 285/93 |
| 4,120,520 | 10/1978 | Ahlstone | |
| 4,124,229 | 11/1978 | Ahlstone | 285/381 X |
| 4,124,230 | 11/1978 | Ahlstone | |
| 4,124,231 | 11/1978 | Ahlstone | |
| 4,124,232 | 11/1978 | Ahlstone | |
| 4,124,233 | 11/1978 | Ahlstone | |
| 4,410,204 | 10/1983 | Reimert | 285/27 |
| 4,444,421 | 4/1984 | Ahlstone | 285/86 |
| 4,522,431 | 6/1985 | Reimert | 285/27 |

FOREIGN PATENT DOCUMENTS

2099529 12/1982 United Kingdom .
2113334 8/1983 United Kingdom .

Primary Examiner—Dave W. Arola
Attorney, Agent, or Firm—Browning, Bushman, Zamecki & Anderson

[57] ABSTRACT

A connector assembly includes a pin connector for receipt by a box connector. The pin connector features a neck portion having external threads; the box connector features a collar portion having internal threads, generally complementary for meshing with the external threads. The connectors may be threadedly joined together by longitudinally inserting the pin connector into the box connector, whereupon the two connectors are mutually sealed at two locations on opposite sides of the internal and external threads to define, with the threads, an annular region. Application of fluid pressure to the annular region may radially expand the region to permit further insertion of the pin connector into the box connector to mutually align the internal and external threads. Release of the fluid pressure permits mutual meshing between the threads to threadedly connect the pin and box connectors. The connector assembly may be released by like application of fluid pressure to radially expand the annular region, or by mutual rotation between the pin and box connectors, to disengage the meshing between the internal and external threads.

29 Claims, 7 Drawing Figures

STABBING CONNECTOR

BACKGROUND OF THE INVENTION

1. Field of the Invention

The invention pertains to connectors for tubular members and the like. More particularly, the invention relates to connector assemblies which may be closed without mutual rotation between the assembly members, and finds particular application to the make-up of pipe strings which may then be driven into the ground, for example.

2. Description of the Prior Art

Offshore oil and gas drilling operations typically include the make-up of strings of pipe or casing members, frequently of relatively large diameter. The tubular strings may be driven into the ground underwater to be used for anchoring the drilling platform. Such strings are also used as conduits through the water through which a well may be initiated. The joint between members of such tubular strings must provide both structural strength and fluid pressure integrity. Such features of a joint might be provided by welding. However, since welding is a time-consuming operation, and drilling rig rates are high, particularly offshore, mechanical connectors are generally preferred. Typical mechanical connectors available include the threaded type, in which tubular members are mutually rotated to thread a pin and box connector assembly, for example, breach block connectors in which the connector assemblies mutually engage and are then rotated 30° to 60°, for example, and snap lock connectors. In offshore operations in particular, the installation of such pipe strings may occur prior to the availability of drilling equipment. Consequently, it is preferred to have a connector type that can be quickly made up without the aid of extensive and large rotating torque equipment. Therefore, it is desirable to have a connector assembly which may be closed without the need for rotation of the connector members to complete the closure. Additionally, a preferred connector assembly will provide the needed structural integrity without additional wall thickness that might be needed to accommodate typical snap lock connectors, for example.

SUMMARY OF THE INVENTION

The present invention provides method and apparatus for threadedly connecting connector members without mutual rotation. The connector members, which may be positioned at opposite ends of tubular members to be mutually connected to make up a tubing string, may be made-up by stabbing an externally threaded member into an internally threaded member, applying fluid pressure to the annular region between the two threaded portions of the respective connector members to radially expand the annular region, then further inserting the first member into the second member to mutually align the internal and external threads, and thereafter releasing the fluid pressure to permit the internal and external threads to mesh, leaving the connector members threadedly engaged.

The first connector member, or pin, includes a neck portion featuring external threads. The second connector member, or box, includes a collar portion featuring internal threads. When the neck portion is inserted within the collar portion, the pin and box connectors are mutually sealed at locations on opposite axial sides of the two threaded portions. The sealing may be provided at each location by an elastomeric seal member carried by one of the connector members engaging a seating surface included in the other connector member. Thus, a generally annular region is defined longitudinally between the two sealing locations and laterally generally between the internal threads and the external threads. A fluid pressure communication passage is provided between the annular region and the exterior of the connector assembly. Such a passage may be provided, for example, by a port through the wall of the box connector at the neck portion, and to which a fluid pressure line may be attached.

The neck portion of the pin may be generally frustoconical, so that the external threads are tapered. Similarly, the collar portion of the box may define an internal frustoconical surface broken by the tapered internal threads. In any event, the internal and external threads are generally complementary, at least to the extent that they may be mutually threadedly engaged. With such tapered threads, the neck portion may be inserted into the collar portion without mutual rotation therebetween to an extent where the thread crests of the internal and external threads mutually contact to prevent further insertion of the pin into the box a distance in the range of one pitch length of the threads short of full insertion of the pin into the box for full threaded engagement. This may be accomplished provided the depth of the threads is relatively shallow. Further, it is preferred that the crests of the threads be relatively flat to prevent thread damage.

Application of fluid pressure to the annular region between the threads expands the collar portion and contracts the neck portion, allowing longitudinal forces applied to the pin and box connectors to further insert the pin into the box to mutually align the internal and external threads. Upon release of the fluid pressure, the box and pin connector portions contract and expand, respectively, and the internal and external threads mutually engage. The final movement of the pin into the box during the high pressure phase of the make-up may also land a longitudinal load bearing surface of one of the members against a similar load bearing surface of the other. Such load bearing surfaces may be provided by annular shoulders, for example. Further, the entire length of each thread engaging the complementary thread provides load bearing for maintaining the connector members joined, for example. The thread depth may be shallow, therefore, avoiding the need for extra connector wall thickness for structural strength.

It will be appreciated that the application of fluid pressure need only distort the neck and collar portions small amounts, typically a few hundredths of an inch, to permit the thread crests to mutually bypass.

It will be appreciated that such make-up of the pin and box connectors by stabbing without mutual rotation to effect threading is enhanced by proper rotational alignment between the connectors before engagement of the threads and application of the fluid pressure, for example. Such alignment may be ensured by a guide device, such as a key carried by one of the connector members being received within an appropriately aligned recess in the other connector member when the two members are rotationally aligned to effect proper engagement of the threads upon release of the fluid pressure.

To facilitate insertion of the pin within the box and proper mutual alignment therebetween, one or more internal receptacle surfaces may be provided within the box connector to receive corresponding external guide surfaces provided on the pin member. For example, such guide surfaces, which may be either frustoconical or cylindrical, may be provided toward opposite ends of the neck portion of the pin member, and generally complementary receptacle surfaces, either frustoconical or cylindrical to match the guide surfaces, may be provided at opposite ends of the collar portion within the box. Engagement of the guide surfaces within the receptacle surfaces as the pin is being inserted within the box and before initial engagement of the threads ensures that the threads will be appropriately aligned with respect to rotation of the members about axes perpendicular to their respective longitudinal axes as the pin threads are approaching the box threads before fluid pressure is applied to prevent thread damage.

To release the threaded connection between the pin and box connectors, fluid pressure may be applied to contract the pin threads from the expanding box threads, whereupon the pin can be removed from the box. Alternatively, back rotation between the two members may be effected to disengage the meshing of the internal and external threads. Similarly, an alternative method to connect the two connector members includes threading the pin and box together by rotational movement.

The present invention thus provides apparatus and method for effecting make-up connections by stabbing without rotation, and wherein the resulting connection assembly provides sufficient structural strength and pressure integrity. The threaded connection that is effected between the pin and box connectors may be released by back rotation to disengage the threads. The present invention is applicable to tubular members in general. For example, the present invention may be employed in the make-up of strings of casing members and the like utilized in offshore drilling operations.

DESCRIPTION OF PREFERRED EMBODIMENTS

Figure 1:
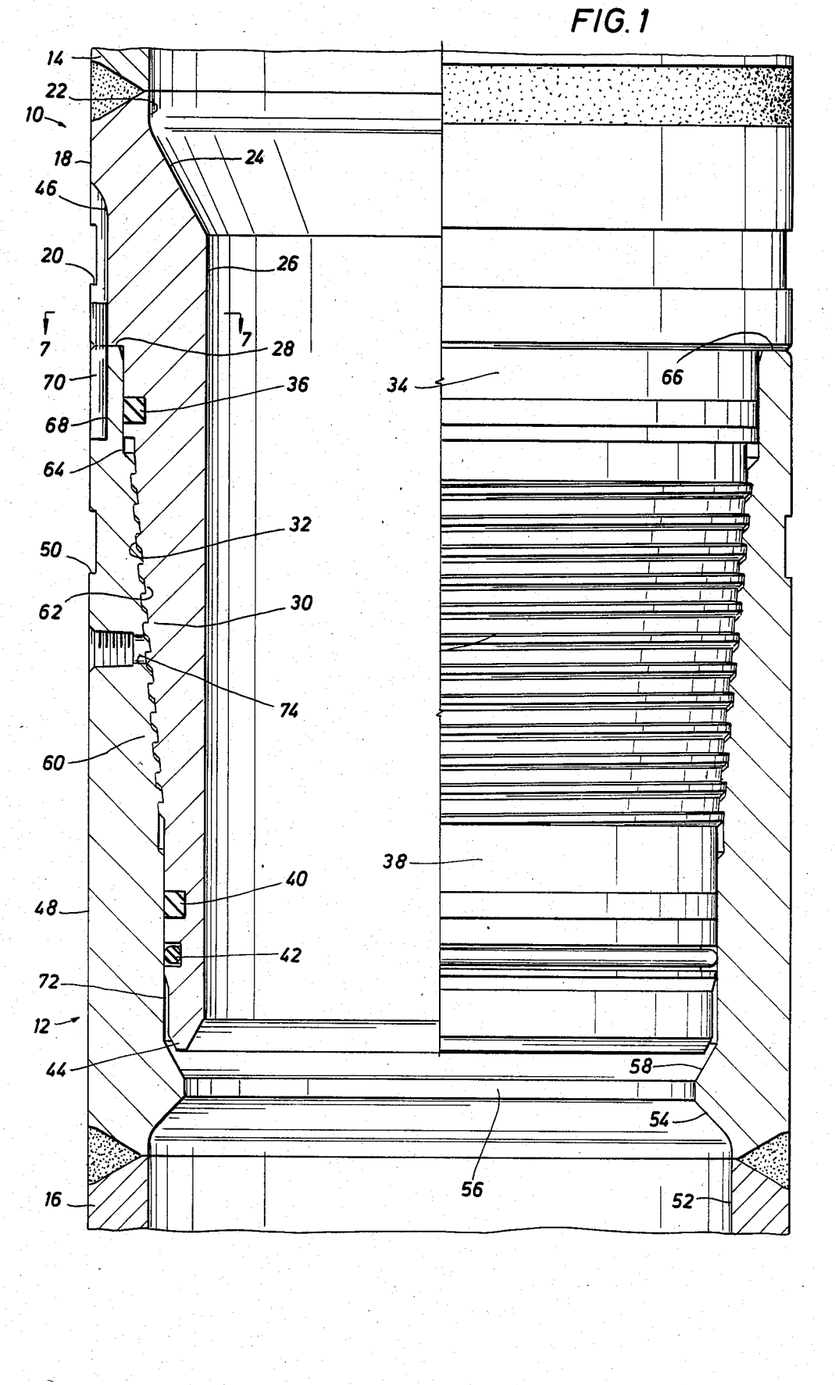
FIG. 1 is a longitudinal sectional view of a connector assembly according to the present invention, showing a box connector in cross section and a pin connector in quarter section in threaded engagement with the box connector.

A pin connector member according to the present invention is shown generally at 10 in FIG. 1, threadedly connected and sealed to a box connector member according to the present invention shown generally at 12. The pin 10 is welded to one end of a tubular member 14, and the box 12 is welded to one end of a second tubular member 16 so that connection between the pin and box members provides connection between the two tubular members 14 and 16.

The tubular pin member 10 extends from the tubular member 14 in a generally cylindrical base portion 18, which is broken by an annular groove 20 for purposes discussed hereinafter. The internal passage of the tubular member 14 is continued within the base portion 18 is a generally cylindrical passage section 22, which may be of the same transverse cross section as the passage of the tubular member 14 as indicated. A frustoconical shoulder 24 narrows the internal passage from the cylindrical portion 22 to a cylindrical portion 26 of lesser transverse cross section and which continues to the open end of the pin member 10.

The base portion 18 ends in an annular landing surface, provided by a downwardly-facing shoulder 28 as indicated. Beyond the shoulder 28 is a neck portion 30, featuring external threads 32. Between the shoulder 28 and the neck portion 30 is positioned an external, annular guide surface 34, broken by an annular groove carrying an elastomeric seal member 36. Beyond the neck portion 30 is a second external annular guide surface 38, also broken by an annular groove carrying a second elastomeric seal member 40. The second guide surface 38 is also broken by another annular groove carrying an O-ring seal 42 below the seal member 40 as indicated. The pin member 10 continues beyond the second guide surface 38 to the open end of the pin which is defined by a tapered annular lip 44.

The pin member neck portion 30 is generally frustoconical in its outer profile so that the threads 32 are tapered. Further, the second guide surface 38 is of lesser lateral dimension than the first guide surface 34. Each of the guide surfaces 34 and 38 may be generally cylindrical or frustoconical, narrowing toward the open bottom end of the pin member 10.

The base portion 18 of the pin member 10 is broken by an elongate, longitudinally-oriented slot 46 in the outer surface of the base portion for a purpose discussed hereinafter.

The box connector 12 provides a generally tubular housing 48 which may feature a generally cylindrical exterior broken by an annular groove 50 for a purpose discussed hereinafter. The internal passage of the tubular member 16 continues in the box connector 12 along a generally cylindrical passage section 52 which may be of the same transverse cross section as the passage of the tubular member 16. A frustoconical shoulder 48 narrows the passage through the box connector 12 to a cylindrical, inwardly-extending lip 56, beyond which lies a second frustoconical shoulder 58.

Beyond the shoulder 58 lies an internal collar portion 60 defining a recess surrounded by the collar section and featuring internal threads 62. Between the collar section 60 and the open end of the box connector 12 is a receptacle, or recess, 64. The surface defining the receptacle 64 also serves as a seating surface, as discussed hereinafter. The open end of the box connector 12 is surrounded by an annular, flat landing surface 66.

The exterior surface of the box housing 48 is also broken by an elongate, longitudinally-oriented slot 68 extending to the end of the box 12. The slot 68 may receive an elongate key 70, for a purpose discussed hereinafter.

Between the frustoconical shoulder 58 and the collar section 60 is a second receptacle, or recess, 72, whose defining surface also serves as a seating surface, as discussed hereinafter. As illustrated, the internal surface of the collar section 60 is generally frustoconical, so that the threads 62 are tapered. Further, the transverse diameter of the second receptacle 72 is smaller than that of the first receptacle 64. Each of the first and second receptacles 64 and 72, respectively, may be generally cylindrical or frustoconical. It will be appreciated, from FIG. 1, that the first and second guide sections 34 and 38, respectively, may be received within the first and second receptacles 64 and 72, respectively, so that each guide section is generally complementary to the corresponding receptacle section. The tapered external threads 32 of the pin 10 are generally complementary to the tapered internal threads 62 of the box 12, at least insofar as the two threads may be meshed to threadedly connect the pin and box members. The first and second seal members 36 and 40, respectively, may provide sliding, sealing engagement with the first and second receptacles 64 and 72, respectively, when the pin 10 is positioned within the box 12 as illustrated in FIG. 1. In such configuration, the O-ring seal 42 carried by the pin 10 provides sealing engagement with the second receptacle surface 72 of the box 12.

The box member 12 is broken, at the collar portion 60, by a port 74 extending through the wall of the housing 48. The port 74 is internally threaded for a purpose discussed hereinafter.

Figure 2:
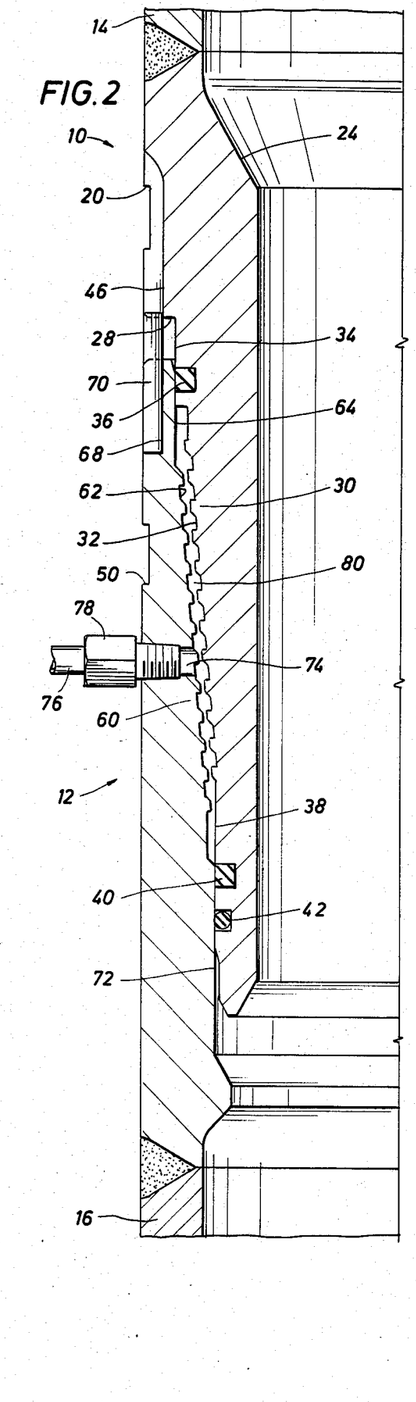
FIG. 2 is a fragmentary view in partial section of the pin and box connectors of FIG. 1 showing the pin being inserted within the box but prior to contact between the respective threads.

FIGS. 2-5 illustrate the method of threadedly connecting the pin member 10 with the box member 12. With the two members 10 and 12 initially disconnected, the pin 10 may be inserted within the box 12 as illustrated in FIG. 2. The first and second guide surfaces 34 and 38, respectively, are received within the first and second receptacles 64 and 72, respectively. Sealing engagement is effected between the first and second seal members 36 and 40, respectively, seating against the first and second receptacle surfaces 64 and 72, respectively. As illustrated in FIG. 2, such receipt of the guide surfaces by the receptacles, and sealing therebetween, is achieved with no meshing of the pin threads 32 with the box threads 62, and ensures that the pin 10 and box 12 are longitudinally aligned, that is, aligned with respect to their longitudinal axes, to prevent possibly damaging contact between the threads as the pin is received by the box. The operation of guide surfaces and receptacles ensuring proper alignment of threaded connector members to avoid cross-threading is discussed, for example, in U.S. Pat. No. 4,410,204, which is incorporated herein by reference.

As the pin 10 is so inserted within the box 12, the two connector members are mutually rotationally aligned so that the key 70 carried by the box slot 68 is received within the pin slot 46. Details of the key 70 and slots 46 and 68 may be appreciated by reference to FIGS. 1, 2 and 7. The box slot 68 is dove-tailed in cross section to receive the complementary dove-tailed key 70. The lower portion of the pin slot 46 may also be dove-tailed as indicated. However, the pin slot 46 extends sufficiently upwardly away from the pin shoulder 28 for insertion of the pin 10 into the box 12 as discussed hereinafter, and to permit elevation of the key 70 above the dove-tailed portion of the pin slot for removal of the key from both the pin and box slots entirely for subsequent rotational motion between the pin 10 and box 12, as also discussed hereinafter.

Thus, the pin 10 and box 12 are aligned longitudinally by means of the guide surfaces 34 and 38 being received within the receptacles 64 and 72, respectively, and the connector members are rotationally aligned by means of the pin slot 46 being aligned to receive the key 70 being carried by the box slot 68.

It will be appreciated that the pin 10 may be stabbed longitudinally into the box 12 a limited distance, whereby the pin threads 32 and the box threads 62 do not become threadedly engaged. Further, insertion of the pin 10 into the box 12 would ultimately be prohibited by contact between the crests of the pin threads 32 and the box threads 62. A fluid pressure line 76 may be connected to the port 74 by means of an appropriate fitting 78 which threadedly engages within the port and seals thereto. Both the port 74 and the fitting 78 may be tapered to enhance such sealing, for example. The fluid pressure line 76 thus communicates with an annular region 80 defined between the neck portion 30 and threads 32, the collar portion 60 and threads 62, and the location of the two seal members 36 and 40 sealingly engaging the box surfaces 64 and 72, respectively.

Figure 3:
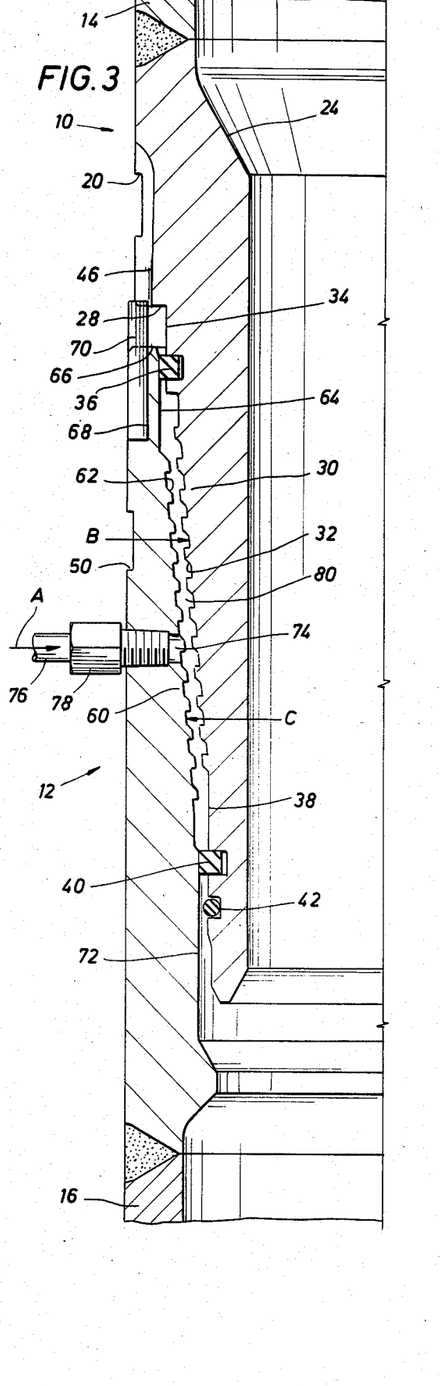
FIG. 3 is a view similar to FIG. 2 but illustrating the expansion of the region between the threads of the connectors by application of fluid pressure, with the expansion being shown exaggerated for purposes of clarity.

With the fluid pressure line 76 in place as illustrated, fluid pressure may be introduced into the annular region 80, as indicated by the arrow A in FIG. 3 by means of hydraulic fluid, for example, from a conventional source (not shown). The effect of a fluid pressure build up in the annular region 80 is to apply forces to the neck portion 30 and collar portion 60, as indicated generally by the arrows B and C, respectively. Such forces tend to contract the neck portion 30 and expand the collar portion 60, thus radially enlarging the annular region 80 as indicated by FIG. 3, compared to FIG. 2, for example. The extent of the radial enlargement of the annular region 80 is shown exaggerated in FIG. 3 for purposes of clarity. The seal members 36 and 40 maintain sealing engagement between the pin connector 10 and the box connector seating surfaces 64 and 72, respectively, in the presence of the increased fluid pressure in the annular region 80 to maintain the annular region defined at its axial extremities and to permit such pressure build up therein. The seal members 36 and 40 are thus provided to function even with the contraction of the neck portion 30 and the expansion of the collar portion 60. The O-ring seal 42 need not function to provide such high pressure sealing during enlargement of the annular region 80.

Figure 4:
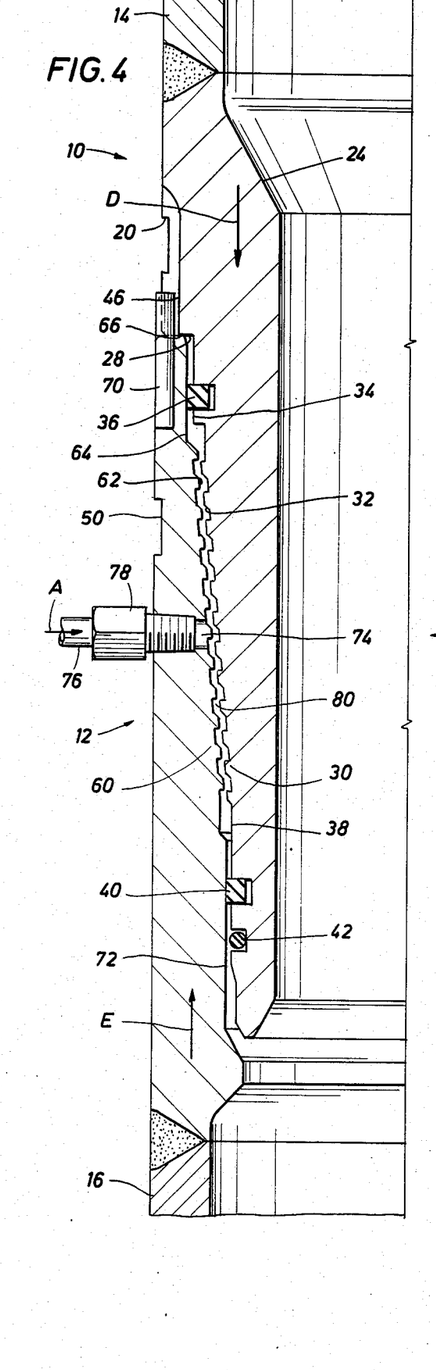
FIG. 4 is a view similar to FIGS. 2 and 3, but illustrating the further advancement of the pin connector within the box connector in the presence of applied fluid pressure to permit bypass of the thread crests.

The radial expansion of the annular region 80 laterally separates the external pin threads 32 and the internal box threads 62. Longitudinal forces may then be applied to the pin 10 and box 12, as indicated, for example, by the arrows D and E, respectively, in FIG. 4 to further insert the pin into the box. Ultimately, the landing surface 66 at the end of the box 12 may engage the annular shoulder 28 of the pin, preventing further insertion of the pin into the box and providing loading contact between the two connector members. The annular grooves 20 and 50 provided on the outer surfaces of the pin 10 and box 12, respectively, may be utilized to engage tools, for example, to sufficiently grasp the pin and box connector members to apply such longitudinal forces to drive the pin into the box and effect sufficient pre-loading of the box shoulder 66 against the pin shoulder 28. Upon such further insertion of the pin 10 into the box 12, the pin threads 32 become aligned with the box threads 60 as illustrated in FIG. 4 wherein the helical crests of one of the sets of threads is laterally opposite the helical troughs of the other threads. The seal members 36 and 40 continue to provide sliding, sealing engagement between the two connector members 10 and 12.

Figure 5:
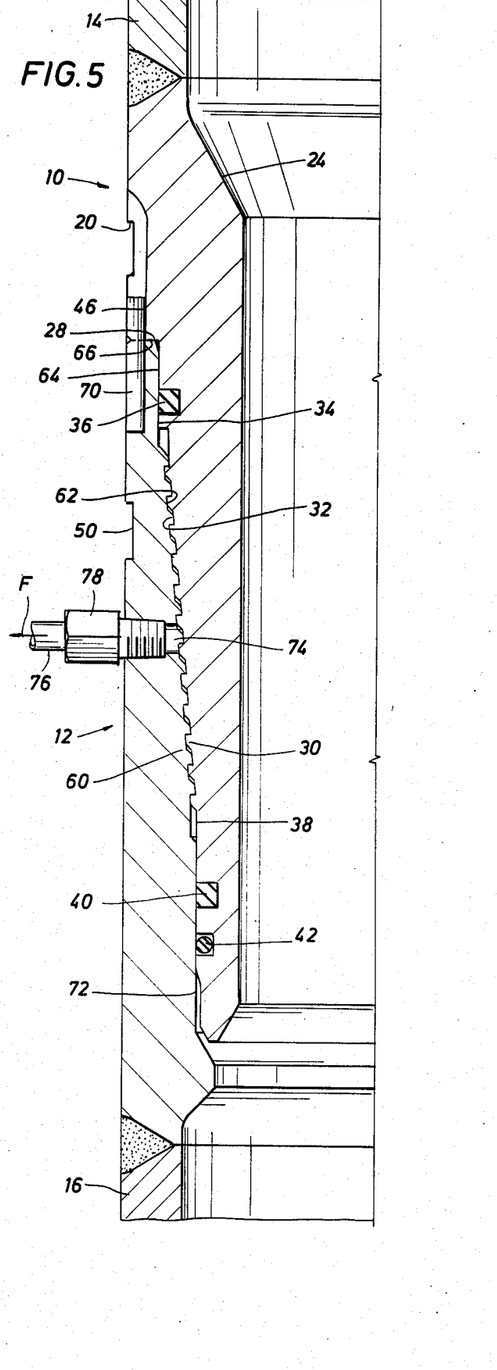
FIG. 5 is a view similar to FIGS. 2-4 but showing the pin and box threads in meshing engagement upon release of the fluid pressure.

With the pin and box thus configured as illustrated in FIG. 4, the fluid pressure may be released from the annular region 80 by means of the fluid pressure line 76, as indicated by the arrow F in FIG. 5, and the line 76 and fitting 78 removed (to be replaced by a plug, if desired). As the fluid pressure is reduced in the annular region 80, the pin neck portion 30 relaxes by expanding and the box neck portion 60 relaxes by contracting, with the result that the pin threads 32 mesh with the box threads 62 as illustrated in FIG. 5. The O-ring seal 42 provides sliding, sealing engagement between the pin connector 10 and the internal seating surface 72 of the box connector 12, thus maintaining fluid-tight sealing engagement between these two connector members. It will be appreciated that such sealing engagement may be continued to be provided by the seal member 40, for example, in which case the O-ring seal 42 need not be included as part of the connector assembly.

The threaded engagement between the pin 10 and box 12 as illustrated in FIG. 5, with the box shoulder 66 positioned tightly against the pin shoulder 28 provides a pre-loaded, fluid-tight connection between the connector members 10 and 14 as well as the tubular members 14 and 16.

The pin 10 and box 12 may be mutually disengaged from the connected configuration of FIG. 5 by generally reversing the procedure described hereinbefore. Thus, fluid pressure may be introduced by means of the line 76 through the port 74 to contract the neck 30 and expand the collar 60 to separate the pin threads 32 and the box threads 62 (FIG. 4). Thereafter, longitudinal forces may be applied to urge the pin 10 outwardly of the box 12. As soon as the pin 10 and box 12 are so displaced to avoid meshing of the threads 32 and 62, the fluid pressure may be released by the port 74, and the pin completely removed from the box. Alternatively, the pin 10 and box 12 can be sufficiently displaced to slide the seal member 36 beyond the upper end of the seating surface 64, for example, to allow the fluid pressure to vent as the pin is completely removed from the box.

Alternatively, the threaded connection between the two connector members 10 and 12 may be released by back-rotation between the connector members. The key 70 may be removed from the box slot 68 by sliding of the key upwardly, as viewed in FIG. 5, to allow the key to clear the dove-tailed construction of the box slot (and of the pin slot 46 if so constructed) whereupon rotational motion may be effected between the pin 10 and the box 12. In the embodiment illustrated (FIG. 1), the threads 32 and 62 are shown as righthand threads, so that lefthand, or counterclockwise, rotation between the connector members 10 and 12 would release threaded connection therebetween. It will be appreciated that the pin and box threads may be provided in the lefthand sense, so that back-rotation would be effected by clockwise rotational movement between the connector members to effect such release.

Since the locking of the pin 10 and box 12 is effected by meshing of the pin threads 32 with the box threads 62, the pin and box connectors may, alternatively, be joined together by rotation of one connector member relative to the other as the pin is inserted into the box (with the key 70 removed) in much the same fashion that a standard threaded connection is effected, provided sufficient means are available to carry out such rotational movement at the site. However, the present invention provides that the pin 10 and box 12 may be driven together with considerable longitudinal forces while the pin threads 32 are not meshed with the box threads 62. Such pre-loading of the connection between the pin 10 and box 12 might not be effected where the connector members are being rotated to effect threaded connection therebetween, if the threads in such case are required to bear the load of such longitudinal forces. Consequently, by utilizing fluid pressure to expand the annular region 80 while such loading is effected between the box shoulder 66 and the pin shoulder 28 without contact between the threads 32 and 62, the present invention provides apparatus and method for effecting a threaded engagement between connector assemblies that are pre-loaded to an extent that might not be otherwise available.

The pin and box slots 46 and 68 may be utilized to anchor tools, for example, applied to the pin and box connectors 10 and 12, respectively, to rotate the one relative to the other to effect engagement or disengagement of the two connector members.

Figures 6, 7:
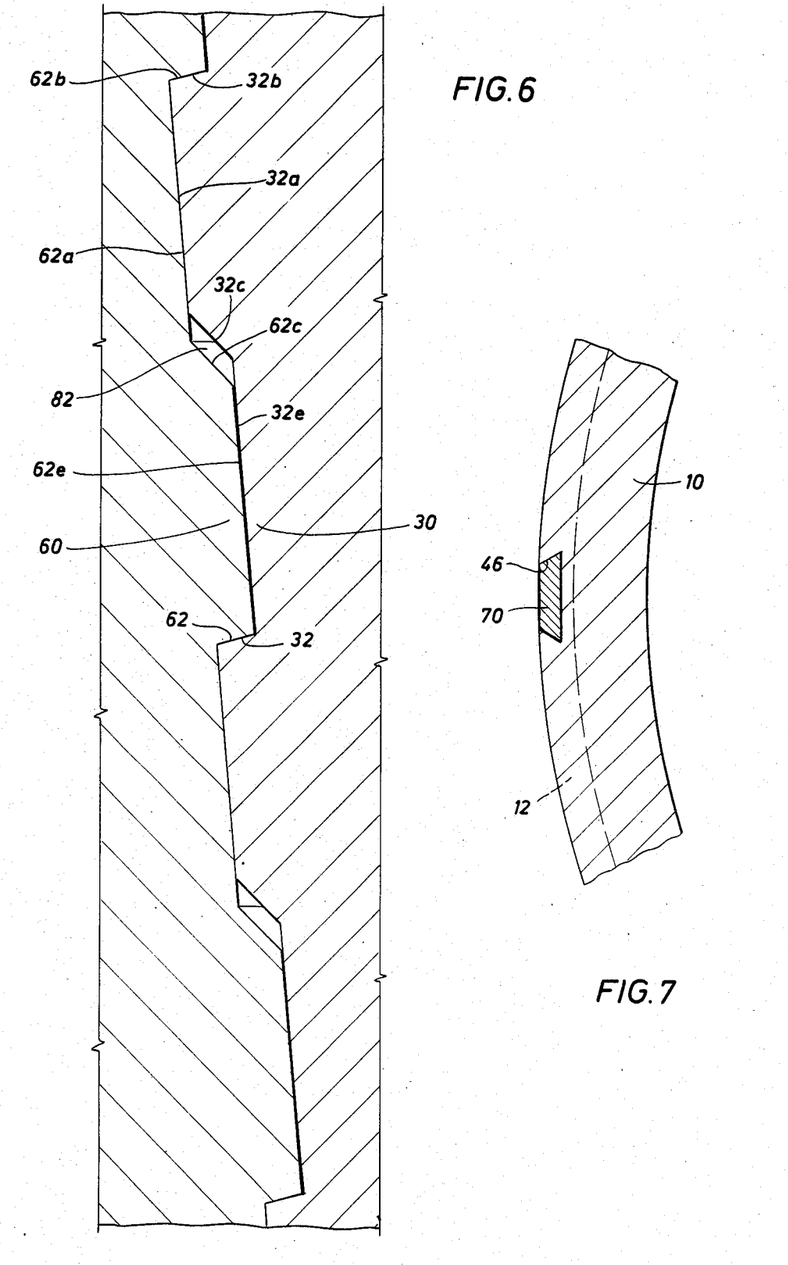
FIG. 6 is a fragmentary enlarged sectional view of the pin and box connector members of FIGS. 1-5 showing the meshing of the respective threads.
FIG. 7 is a fragmentary horizontal sectional view taken along line 7—7 of FIG. 1 and illustrating the key alignment apparatus.

An enlarged view of the meshing of the pin threads 32 with the box threads 62 is shown in FIG. 6, wherein details of suggested thread forms are illustrated. Generally, the threads 32 and 62 are coarse, and adjacent crests and troughs are separated by shoulders set at obtuse angles relative to the crests and troughs so that the lateral cross sections of the threads may exhibit a wedge, or inclined plane, effect to facilitate meshing of the threads. The threads 32 and 62 are relatively shallow, and their respective loading surfaces are presented at angles only a few degrees removed from perpendicular to the common longitudinal axes of the pin 10 and box 12 connector members in the threadedly engaged configuration of FIG. 5. For example, the external pin thread 32 features a relatively flat crest 32a bounded on its upper side by a relatively flat shoulder 32b extending but a few degrees downwardly relative to perpendicular to the pin longitudinal axis. The bottom edge of the thread crest is bounded by a sloping, relatively flat shoulder 32c. The internal box thread 60 features a relatively flat trough 62a which receives the pin thread crest 32a, but which is longer relative thereto. The upper edge of the box thread trough 62a is bounded by a downwardly-facing shoulder 62b generally complementary to the upwardly-facing shoulder 32b of the pin thread 32 and, therefore, set at an angle but a few degrees from perpendicular to the box connector longitudinal axis. The bottom of the box thread trough 62a is bounded by a sloping, relatively flat shoulder 62c. The box thread crest 62e is also flat and is received by the flat pin thread trough 32e. However, the pin thread trough 32e is longer than the box thread crest 62e as illustrated. The crests 32a and 62e, and the troughs 32e and 62a may all be set at the angle of taper of the neck 30 and collar 60.

The flat crests 32a and 62e of the pin and box threads, respectively, avoid possible thread damage that might be caused by the edges of the pin and box connectors, for example, during connector manipulations prior to the reception of the guide surfaces 34 and 38 within the receptacles 64 and 72, respectively, for example. The wedge effect provided by the sloping of the pin thread walls 32b and 32c, and of the box thread walls 62b and 62c, minimizes the closeness of tolerances that might otherwise be required in the manufacture of the threads 32 and 62 and placement of the pin and box slots 46 and 68, respectively, ensuring that the pin and box threads slide into mutual meshing upon release of the fluid pressure from the annular region 80. Further, the small slope given to the thread shoulders 32b and 62b, compared to the perpendicular to the common longitudinal axes of the pin and box connectors in the threaded configuration of FIG. 5, ensures that the connection between the pin and box members remains pre-loaded. It will be appreciated that the threads may be cut, as illustrated, to generate a space 82 between the thread shoulders 32c and 62c when the pre-loading forces have been applied during the connection process. Otherwise, the space 82, shown exaggerated in FIG. 6 for purposes of clarity, provides that the threads 32 and 62 are not so-tightly joined during rotational release operations to otherwise prevent mutual rotation between the connector members 10 and 12.

Rotational alignment between the two connectors about their longitudinal axes to effect thread engagement upon release of the fluid pressure may also be achieved by any appropriate guide or alignment technique other than use of the key 70 and slots 46 and 68. For example, guiding apparatus may include a mark carried by the pin connector 10 to be aligned with a mark carried by the box connector 12 when proper rotational alignment is achieved between the two connectors as they are being positioned for connection.

The present invention provides method and apparatus for effecting threaded engagement between connector members without mutual rotation therebetween, but by stabbing one connector member into the other and separating their threads by fluid pressure to achieve alignment of the threads for meshing. Further, the connection thus achieved may be substantially pre-loaded without applying excessive loading forces to threads while threadedly engaging them by rotational motion therebetween, since such rotational movement is not required by the present invention. The connection may be released by separating the threads by fluid pressure. Alternatively, the connector members of the preferred embodiment illustrated and described herein may be threadedly connected by rotation. In either case, rotational movement between the connector members may be effected to release the connection between the pin and box members by disengaging the threads through such mutual rotation.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A connector assembly comprising:
   a. a first connector member including a neck portion featuring external threads;
   b. a second connector member including a collar portion featuring internal threads which may threadedly engage with said external threads with said neck portion of said first member being received within said collar portion of said second member;
   c. first and second seal means for providing sealing engagement between said first and second members at axially spaced first and second general locations, respectively, when said neck portion of said first member is received within said collar portion of said second member, thereby defining an annular region between said first and second general locations and between said first and second members; and
   d. fluid pressure communication means whereby fluid pressure may be selectively applied to said annular region when said neck portion of said first member is received within said collar portion of said second member;
   e. wherein said neck portion of said first member may be received at least partially within said collar portion of said second member, with said members mutually aligned about their longitudinal axes and such fluid pressure may be applied by means of said fluid pressure communication means to radially expand said annular region to permit said external and internal threads to clear allowing full insertion of said first member into said second member without relative rotation therebetween and in which position said threads engage upon reduction of said fluid pressure.

2. Apparatus as defined in claim 1 wherein said external threads are tapered and said internal threads are tapered.

3. Apparatus as defined in claim 1 wherein each of said first and second seal means comprises an elastomeric seal member carried by one of said first or second members, and a seating surface carried by the other of said first or second members with which said seal member may sealingly engage.

4. Apparatus as defined in claim 1 wherein said fluid pressure communication means comprises port means for communicating fluid pressure through said collar portion of said second member between said annular region and the exterior of said second member.

5. Apparatus as defined in claim 1 further comprising:
   a. at least one internal receptacle surface as part of said second member; and
   b. at least one external guide surface as part of said first member, generally receivable by such receptacle surface of said second member when said first member is received within said second member to urge said first and second members into mutual alignment.

6. Apparatus as defined in claim 1 further comprising:
   a. a first receptacle surface included in said second connector member and positioned toward one end of said internal threads thereof, and a second receptacle surface included in said second member and positioned toward the other end of said internal threads thereof; and
   b. a first guide surface included in said first connector member and positioned toward one end of said external threads thereof, and a second guide surface included in said first member and positioned toward the other end of said external threads thereof, such that, as said first member is being received within said second member, said first guide surface may be received within said first receptacle and said second guide surface may be received within said second receptacle to align said first and second members prior to said internal and external threads being so mutually meshed.

7. Apparatus as defined in claim 1 further comprising guide means carried by said first and second members for use in mutually aligning said first and second members about their respective longitudinal axes for receipt of said first member by said second member.

8. Apparatus as defined in claim 7 wherein said guide means comprises key means carried by one of said first or second connector members and recess means included in the other of said first or second members for receiving said key means when said first and second members are so mutually aligned about their respective longitudinal axes.

9. Apparatus as defined in claim 1 wherein, with said internal and external threads mutually meshed, fluid pressure may be applied to said annular region to radially expand said annular region to laterally separate and release said external and internal threads whereby said first member may be removed from said second member.

10. Apparatus as defined in claim 1 wherein, with said internal and external threads mutually meshed, said first and second members may be mutually rotated about their respective longitudinal axes to release said internal and external threads whereby said first member may be removed from said second member.

11. Apparatus as defined in claim 1 wherein said internal and external threads may be mutually meshed, with said first member received within said second member, by mutual rotation about the longitudinal axes of said first and second members without application of fluid pressure to so expand said annular region.

12. Apparatus as defined in claim 1 wherein:
a. said internal threads feature, in lateral cross section, generally flat troughs and generally flat crests with adjacent crests and troughs separated by shoulders forming, with said crests and troughs, obtuse angles; and
b. said external threads feature, in lateral cross section, generally flat troughs and generally flat crests with adjacent crest and troughs separated by shoulders forming, with said crests and troughs, obtuse angles.

13. A tubular member comprising:
a. a tubular section;
b. a box connector at one end of said tubular section, including a collar portion featuring internal threads;
c. a pin connector at the other end of said tubular section including a neck portion featuring external threads;
d. fluid pressure communication means included in one or the other of said pin and box connectors; and
e. seal means carried by at least one of said connectors;
f. wherein such collar portion of such box connector of one such tubular member may receive such neck portion of such pin connector of a like tubular member, said internal and external threads being capable of mutually threadedly engaging, said neck portion being at least partially received by said collar portion, with said portions mutually aligned about their respective longitudinal axes and, with said seal means providing sealing engagement between said pin connector and said box connector at two general locations on opposite axial sides of said internal and external threads, whereby fluid pressure may be communicated to an annular region so defined between said two general locations and between said internal and external threads to radially expand said annular region to clear said internal and external threads thereby permitting longitudinal movement of said pin connector into said box connector without relative rotation therebetween so that, upon release of such fluid pressure, said internal and external threads will mutually threadedly engage.

14. Apparatus as defined in claim 13 wherein said fluid pressure communication means comprises port means for communicating fluid pressure between said annular region and the exterior of said box and pin connectors.

15. Apparatus as defined in claim 13 further comprising:
a. at least one internal receptacle surface as part of such box connector; and
b. at least one external guide surface as part of such pin connector, generally receivable by such receptacle surface of said box connector when said pin connector is so received within said box connector to urge said pin and box connectors into mutual alignment.

16. Apparatus as defined in claim 13 further comprising guide means carried by said pin and box connectors for use in mutually aligning said pin and box connectors about their respective longitudinal axes for receipt of said pin connector by said box connector.

17. Apparatus as defined in claim 16 wherein said guide means comprises key means carried by one of said pin or box connector members and recess means included in the other of said pin or box connectors for receiving said key means when said pin and box connectors are so mutually aligned about their respective longitudinal axes.

18. Apparatus as defined in claim 13 wherein, with said internal and external threads mutually meshed, said pin and box connectors may be mutually rotated about their respective longitudinal axes to release said internal and external threads whereby said pin connector may be removed from said box connector.

19. Apparatus as defined in claim 13 wherein said internal and external threads may be mutually meshed, with said pin connector received within said box connector, by mutual rotation about the longitudinal axes of said pin and box connectors without application of fluid pressure to so expand said annular region.

20. Apparatus as defined in claim 13 wherein:
a. said internal threads feature, in lateral cross section, generally flat troughs and generally flat crests with adjacent crests and troughs separated by shoulders forming, with said crests and troughs, obtuse angles; and
b. said external threads feature, in lateral cross section, generally flat troughs and generally flat crests with adjacent crests and troughs separated by shoulders forming, with said crests and troughs, obtuse angles.

21. Apparatus as defined in claim 13 wherein said seal means comprises an elastomeric seal member carried by one of said first or second members, and a seating surface carried by the other of said first or second members with which said seal member may sealingly engage.

22. Apparatus as defined in claim 13 wherein said internal threads are tapered and said external threads are tapered.

23. Apparatus as defined in claim 13 wherein, with said internal and external threads mutually meshed, fluid pressure may be applied to said annular region to radially expand said annular region to laterally separate and release said internal and external threads whereby said pin connector may be removed from said box connector.

24. A method of making a threaded connection between first and second members, said members including generally complementary threads and sealing means at opposite ends of said threads, comprising the following steps:
  a. inserting an end of one such member having external threads into an end of the other such member having internal threads so that said sealing means are in engagement and define a sealed annular region between said threads;
  b. applying fluid pressure to the annular region between said internal and external threads to radially expand said region;
  c. further inserting said end of said member with external threads into said end of said member with internal threads without relative rotation therebetween to mutually align said internal and external threads; and
  d. releasing said fluid pressure to permit said internal and external threads to mutually threadedly engage.

25. A method as defined in claim 24 wherein said internal and external threads are generally complementarily tapered.

26. A method as defined in claim 24 wherein said two members further comprise a guide key, carried by one such member, and a recess featured by the other such member for receiving said guide key when said two members are mutually rotationally aligned.

27. A method as defined in claim 24 further comprising the additional step of releasing said two members by mutually rotating said two members to disconnect said threaded engagement between said internal and external threads.

28. A method as defined in claim 24 further comprising the additional step of applying fluid pressure to said annular region to radially expand said region to laterally separate said internal and external threads to release the two members.

29. A method as defined in claim 24 wherein said two members further comprise alignment means whereby said two members may be mutually rotationally aligned.

* * * * *